US012507003B2

(12) United States Patent
Chen et al.

(10) Patent No.: US 12,507,003 B2
(45) Date of Patent: Dec. 23, 2025

(54) VOICE PRE-PROCESSING PIPELINE FOR EXTERIOR COMMUNICATIONS ON AUTONOMOUS VEHICLE

(71) Applicant: GM Cruise Holdings LLC, San Francisco, CA (US)

(72) Inventors: Xin Chen, San Antonio, TX (US); Yu Rao, Sunnyvale, CA (US); Kanthasamy Chelliah, Sunnyvale, CA (US); Amanda Lind, Brooklyn, NY (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 201 days.

(21) Appl. No.: 18/402,225

(22) Filed: Jan. 2, 2024

(65) Prior Publication Data

US 2025/0220339 A1 Jul. 3, 2025

(51) Int. Cl.
*H04R 1/40* (2006.01)
*G10L 21/0208* (2013.01)
*H04R 3/00* (2006.01)

(52) U.S. Cl.
CPC .......... *H04R 1/406* (2013.01); *G10L 21/0208* (2013.01); *H04R 3/005* (2013.01)

(58) Field of Classification Search
CPC ........... G10L 2021/02166; G10L 15/20; G10L 21/0208; G10L 21/0232; H04R 3/005; H04R 1/1083; H04R 1/406; H04R 2201/401; H04R 2201/403; H04R 2225/43; H04R 2227/009; H04R 2430/23; H04R 2499/13; H04R 3/02; H04M 9/082
USPC ........... 381/92, 56–58, 74.14, 94.1–94.5, 86; 700/94
See application file for complete search history.

(56) References Cited

U.S. PATENT DOCUMENTS 7,039,197 B1 * 5/2006 Venkatesh .............. H04R 3/005 381/86
7,853,025 B2 * 12/2010 Sleboda ................. H04R 7/045 181/161
8,275,145 B2 * 9/2012 Buck ....................... H04S 7/301 381/86
2012/0294118 A1 * 11/2012 Haulick .................... G01S 5/30 367/121

(Continued)

*Primary Examiner* — Lun-See Lao
(74) *Attorney, Agent, or Firm* — CANTOR COLBURN LLP

(57) ABSTRACT

Systems and methods for vehicles to communicate with people outside the vehicle. In particular, a two-way communication system is provided including exterior microphone arrays on the vehicle. Calls performed from the exterior of a vehicle can be difficult to implement with acceptable quality in noisy environments. A pipeline having multiple beamformers is provided to improve call quality, where the pipeline operates on the incoming data for each of the microphone arrays. Each beamformer estimates direction of arrival (DOA) of the speech signal, and utilizes the estimated DOA to generate spatial filtering coefficients to filter the signal. A beamformer can be used to generate a one channel output for each microphone array, and a mixer can be used to mix the signal output from each microphone array. The beamformer enables reliable two-way communication with acceptable listening quality and good intelligibility for the remote assistant listening to the captured signal.

20 Claims, 11 Drawing Sheets

(56) References Cited

U.S. PATENT DOCUMENTS

| | | | | |
|---|---|---|---|---|
| 2014/0233757 A1* | 8/2014 | Haulick | ................ | H04M 9/082 381/92 |
| 2019/0069086 A1* | 2/2019 | Chen | ...................... | H04R 1/406 |
| 2023/0129499 A1* | 4/2023 | Sha | ........................ | H04R 3/005 381/71.1 |

* cited by examiner

100

150

400

900

VOICE PRE-PROCESSING PIPELINE FOR EXTERIOR COMMUNICATIONS ON AUTONOMOUS VEHICLE

BACKGROUND

1. Technical Field

The present disclosure generally relates to vehicle communications systems and, more specifically, to exterior vehicle communications.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
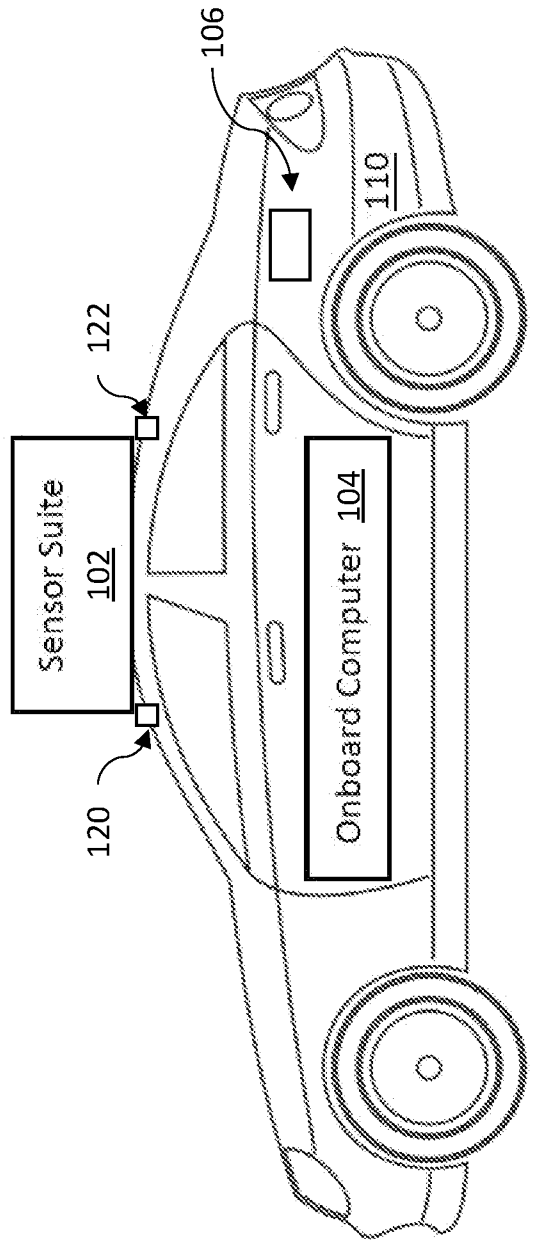
FIGS. 1A and 1B illustrates an autonomous vehicle for exterior communication, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

OVERVIEW

Systems and methods are provided for vehicles to communicate with people outside the vehicle. In particular, a two-way communication system is provided including exterior microphone arrays on the vehicle. In some examples, two-way calls can be completed using linear arrays of microphones at the front and rear of a vehicle, as well as a pair of speakers. The speakers can also be positioned at the front and rear of the vehicle. In various examples, a remote assistant representing the vehicle (or the vehicle owner or manager) can communicate with a person exterior to the vehicle, such as law enforcement personnel.

Calls performed from the exterior of a vehicle can be difficult to implement with acceptable quality in noisy environments, such as on or near a highway or in a busy city, where a vehicle microphone generally has a maximum range of seven feet. One factor is that the distance between the talker and the vehicle microphone is variable. Another factor is that the position of the talker with respect to the vehicle microphone is variable, affecting the direction of arrival of the voice signal at the microphone. An exterior microphone voice beamformer can be used to improve a signal-to-noise ratio (SNR) for a captured speech signal. An exterior microphone beamformer for a vehicle can enable reliable two-way communication with acceptable listening quality and good intelligibility for the remote assistant listening to the captured signal.

In array signal processing, the direction of arrival (DOA) refers to the direction from which a propagating wave arrives at the array. In microphone applications, the DOA describes the angular location of the talker(s) with respect to the microphone array. The performance of a beamformer can be optimized in terms of SNR when the estimated DOA matches the actual DOA. However, due to the wave reflection from and refraction at the vehicle outer shell and geometric features such as the sensor pods, it can be difficult to obtain the accurate sound path from the talker(s) to the microphone arrays. Additionally, the height of the talker(s) and the distances between the talker(s) and the microphone arrays can vary, further complicating accurate determination of DOA. Thus, various factors render DOA estimates based on a grid search difficult, limiting the use of all microphone elements from the microphone arrays to form a single beam. Even when DOA determination is feasible from an algorithmic perspective, the processing time can be prohibitive for use of microphone beamforming in real-time applications, such as two-way calls and communications.

Systems and methods are provided herein for processing exterior microphone signals to provide acceptable listening quality and two-way communications. In particular, a pipeline having multiple beamformers is provided, where the pipeline operates on a small time window for the incoming data for each of the microphone arrays on the vehicle. Each beamformer has a dedicated voice activity detector (VAD) configured to estimate DOA. The beamformer can utilize the estimated DOA output to generate spatial filtering coefficients to filter the signal. In some examples, a beamformer can be used to generate a one channel output for each microphone array, and a mixer can be used to mix the signal output from each microphone array.

Example Vehicle for Exterior Communications

FIG. 1A illustrates an autonomous vehicle 110 having four microphone arrays 120, 122 and a microphone processing module 106 that processes microphone signals to generate intelligible signals and high quality two-way communications, according to some examples of the present disclosure. In various examples, the microphone array 120 is a side view of two microphone arrays, and the microphone array 122 is a side view of two microphone arrays. The microphone arrays are shown in greater detail in FIG. 1B. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data. The microphone processing module 106 uses exterior microphone array signals from the microphone arrays 120, 122, multiple beamformers, and a VAD to filter received signals and generate an output with acceptable speech intelligibility using minimal computation resources, as described herein.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items. Additionally, sensor suite 102 data can provide localized traffic information, ongoing road work information, and current road condition information. Furthermore, sensor suite 102 data can provide current environmental information, such as the presence of people, crowds, and/or objects on a roadside or sidewalk. In this way, sensor suite 102 data from many autonomous vehicles can continually provide feedback to the mapping system and a high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, the onboard computer 104 checks for vehicle updates from a central computer or other secure access point. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 1B:
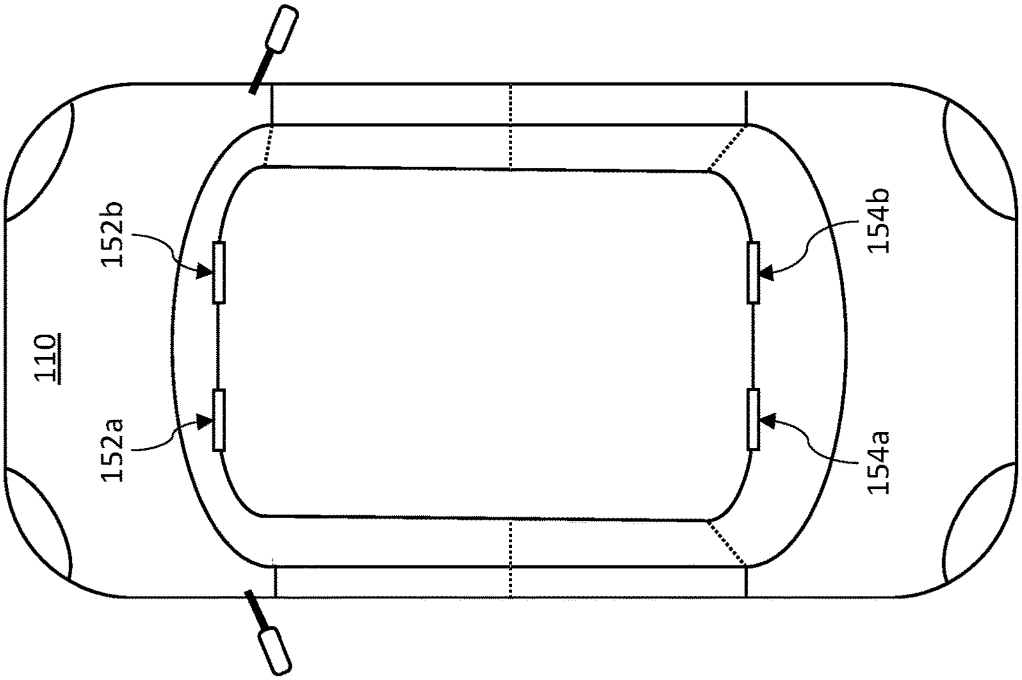

FIG. 1B shows a top-view 150 of the vehicle 110 including four microphone arrays 152*a*, 152*b*, 154*a*, 154*b*, according to some examples of the present disclosure. In some examples, each of the microphone arrays 152*a*, 152*b*, 154*a*, 154*b* includes six microphones. The microphone arrays 152*a*, 152*b*, 154*a*, 154*b* can be used to detect and receive any audio signals. For example, the microphone arrays 152*a*, 152*b*, 154*a*, 154*b* can be used to detect audio signals while the vehicle 110 is driving, including vehicle honking, emergency vehicle sirens, and other alerts. As discussed herein, the microphone arrays 152*a*, 152*b*, 154*a*, 154*b* can be used for two-way communications, such as phone calls between a person exterior to the vehicle and a remote assistant at a back office. In some examples, the person exterior to the vehicle 110 can be a law enforcement officer or an insurance agent.

As shown in FIG. 1B, the microphone arrays 152*a*, 152*b*, 154*a*, 154*b* can be positioned along the front exterior and back exterior of the vehicle 110. For example, the microphone arrays 152*a*, 152*b* can be positioned above the front window (e.g., the windshield) and below the sensor suite. Similarly, the microphone arrays 154*a*, 154*b* can be positioned above the rear window and below the sensor suite. In other implementations, the microphone arrays 152*a*, 152*b*, 154*a*, 154*b* can be positioned elsewhere on the exterior of the vehicle. In some examples, the microphone arrays 152*a*, 152*b*, 154*a*, 154*b* are located at positions on the vehicle 110 that have low turbulent air flow at high speeds.

In some examples, additional microphone arrays are included on the vehicle 110. According to some examples, increasing the number of microphones increases the signal to noise ratio. For instance, in one example, doubling the number of microphones can increase the SNR by about 3 dB (where dB=decibels). In some examples, one or more microphones (or microphone arrays) can be added on the right and/or left sides of the vehicle 110 to improve audio signal side coverage during two-way communications. In some examples, MEMS devices are included on the vehicle 110 that directly sense airborne sound. In some examples, MEMS devices are included on the vehicle 100 to sense vibration. In various examples, additional sensor data can be used to filter out noise and improve the SNR of the voice signal during two-way communications. In general, data from the microphone arrays 152*a*, 152*b*, 154*a*, 154*b*, as well as any additional sensor data, can be utilized to filter out noise, determine DOA, and beamform detected audio signal data. Collected data can then be combined to generate intelligible speech and voice data for effective real-time two-way communication.

Example System for Vehicle Two-Way Communication

Figure 2:
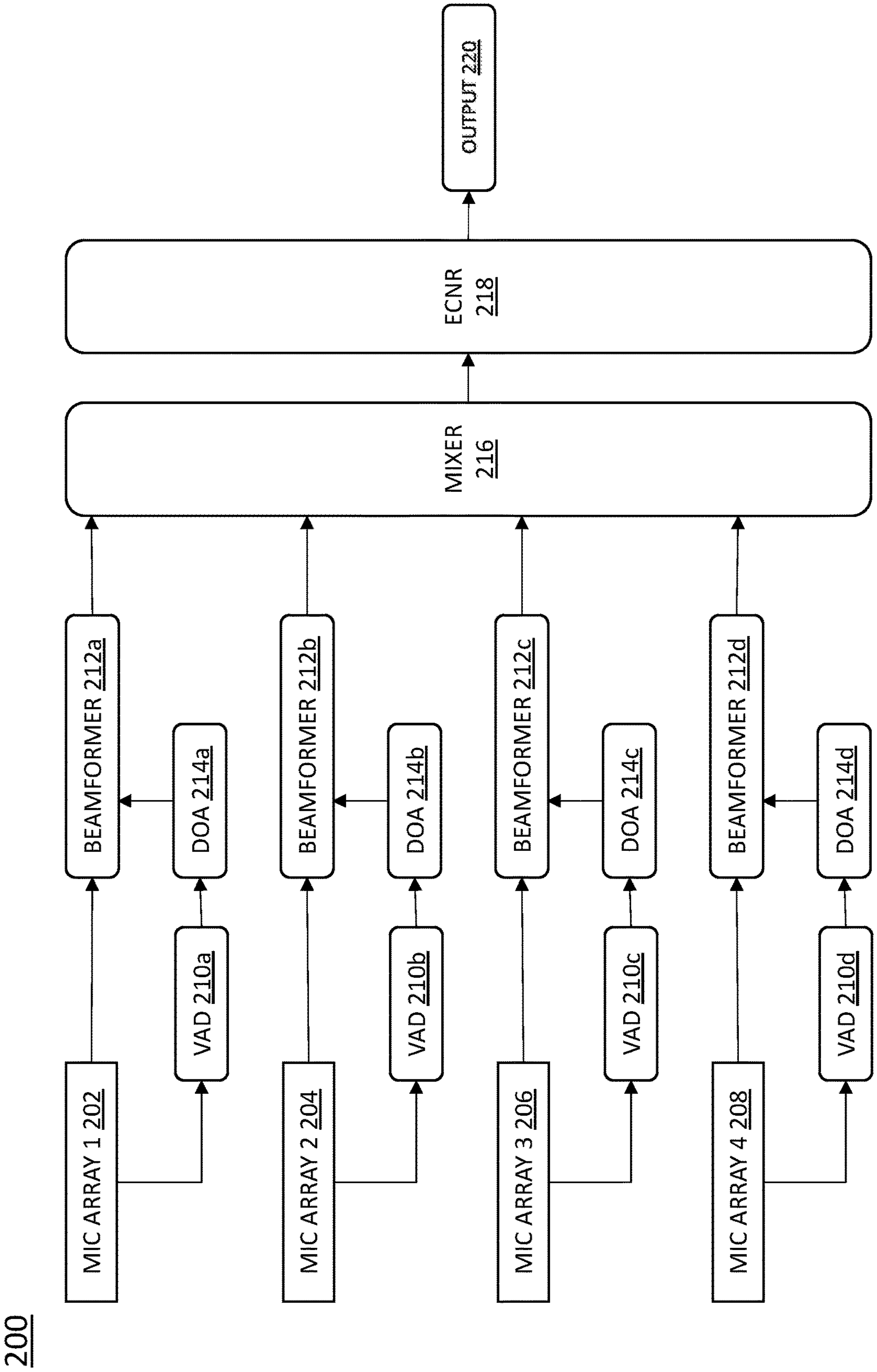
FIG. 2 is a block diagram illustrating an example of a system for processing input to exterior vehicle microphones for vehicle two-way communication, according to some examples of the present disclosure.

FIG. 2 is a block diagram illustrating an example of a system 200 for processing input to exterior vehicle microphones for vehicle two-way communication, according to some examples of the present disclosure. The system 200 includes four microphone arrays: first microphone array 202, second microphone array 204, third microphone array 206, and fourth microphone array 208. Each microphone array 202, 204, 206, 208 includes multiple microphones. In some examples, each microphone array 202, 204, 206, 208 includes six microphones. In some examples, various microphone arrays 202, 204, 206, 208 can each have a different number of microphones.

As shown in FIG. 2, the input received at each microphone array 202, 204, 206, 208 is input to a respective voice activity detector (VAD) 210*a*, 210*b*, 210*c*, 210*d*. The VADs 210*a*, 210*b*, 210*c*, 210*d* each estimate a direction of arrival of the voice signal received at the respective microphone array 202, 204, 206, 208, and output respective DOAs 214*a*, 214*b*, 214*c*, 214*d*. Since the microphone arrays 202, 204, 206, 208 are located in different positions on the vehicle, the respective DOAs 214*a*, 214*b*, 214*c*, 214*d* at each microphone array 202, 204, 206, 208 can be different. In some examples, a far-field wave propagation model is assumed for DOA estimation. DOA determination is discussed in greater detail below with respect to FIG. 5.

In various examples, beamforming is performed on each of the microphone arrays 202, 204, 206, 208 individually. The input received at each microphone array 202, 204, 206, 208 is also input to a respective beamformer 212*a*, 212*b*, 212*c*, 212*d*. Each of the beamformers 212*a*, 212*b*, 212*c*, 212*d* also receives the respective estimated DOA 214*a*, 214*b*, 214*c*, 214*d*. Using the received microphone signal and corresponding estimated DOA, each beamformer 212*a*, 212*b*, 212*c*, 212*d* beamforms the received signal from the microphone. In various examples, the beamformer utilizes the estimated DOA 214*a*, 214*b*, 214*c*, 214*d* to generate spatial filtering coefficients to filter the signal. The beamformers 212*a*, 212*b*, 212*c*, 212*d* receive inputs from each microphone in the respective microphone arrays 202, 204, 206, 208, and beamform the signals from each respective array to generate a single channel output for each respective microphone array 202, 204, 206, 208.

The beamformed signals are output to a mixer 216, where each of the beamformed signals are mixed to generate a single mixed output signal. The mixed output signal is input to an echo cancellation noise reduction block 218, which removes echoes from the signal and filters out noise to enhance voice and speech signal quality. The echo cancellation noise reduction block 218 outputs a voice and speech output 220 that can be transmitted to a recipient speaking with the talker(s) exterior to the vehicle.

Figure 3:
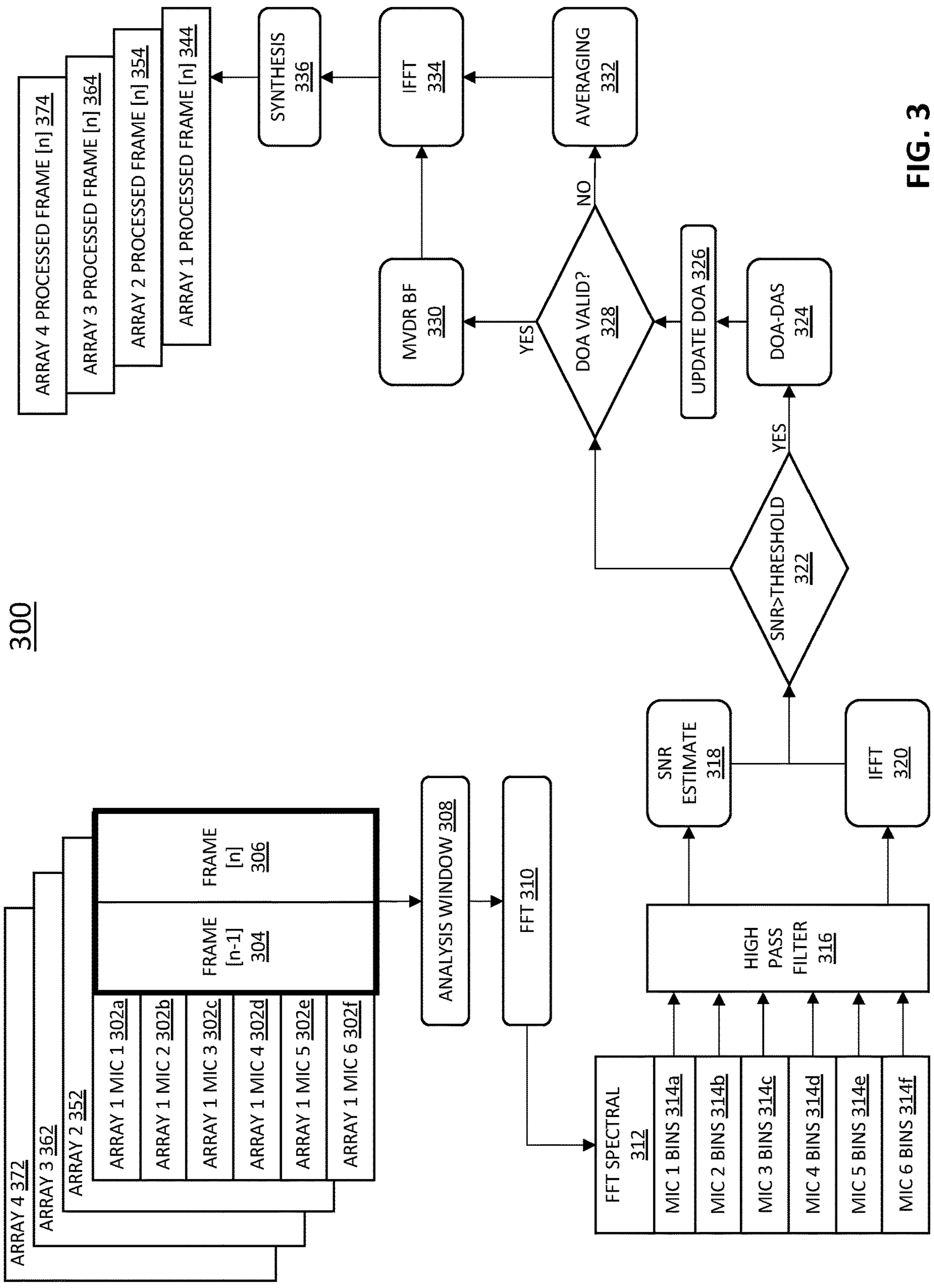
FIG. 3 is a more detailed block diagram illustrating an example of a beamforming system for processing input to exterior vehicle microphone arrays for vehicle two-way communication, according to some examples of the present disclosure.

FIG. 3 is a more detailed block diagram illustrating an example of a beamforming system 300 for processing input to exterior vehicle microphone arrays for vehicle two-way communication, according to some examples of the present disclosure. In particular, FIG. 3 shows a system including four microphone arrays, and illustrates that, for example, the first microphone array includes a first microphone 302*a*, a second microphone 302*b*, a third microphone 302*c*, a fourth microphone 302*d*, a fifth microphone 302*e*, and a sixth microphone 302*f*. Each microphone 302*a*-302*f* of the first microphone array receives an input, and the input can be divided into frames. FIG. 3 shows a second frame [n]306 and a previous first frame [n−1] 304. In various examples, each of the microphones 302*a*-302*f* in the first microphone array generates a first and second input frame with a received audio signal.

The input frames 304, 306 from each microphone in the microphone array are input to an analysis window 308, which performs an analysis on each input frame 304, 306. In various examples, the analysis window 308 defines the data source. In some examples, in the analysis window 308, the input data for a current frame 306 (frame [n]) is concatenated with data from the previous frame 304 (frame [n−1]). A window function can be applied on the time series by multiplying a window weight and a sample value. The outputs from the analysis window 308 are processed with a Fast Fourier Transform (FFT) 310 to generate an FFT spectrum (frequency domain spectrum) for each microphone 302*a*-302*f*. In some examples, the FFT 310 processes data over a selected number of frames for each microphone 302*a*-302*f* to generate respective FFT spectra 314*a*-314*f* for each microphone. For example, the FFT 310 can process data from frames 304 and 306 for each microphone 302*a*-302*f* to generate the respective FFT spectra 314*a*-314*f*. In some examples, the FFT 310 processes data over a selected period of time for each microphone 302*a*-302*f* to generate respective FFT spectra 314*a*-314*f* for each microphone.

The FFT spectra 314*a*-314*f* are filtered at a high pass filter 316 to filter out non-speech noise. The high pass filter 316 filters out low frequency noise. In some examples, the high pass filter 316 filters out frequencies below about 80 Hz, below about 85 Hz, or below about 90 Hz. In various examples, the high pass filter 316 filters each FFT spectra 314*a*-314*f* and outputs a filtered output signal for each FFT spectra 314*a*-314*f*. The filtered signals are output to a signal-to-noise ratio (SNR) estimate module 318 and an inverse FFT (IFFT) module 320.

The SNR estimate module 318 estimates the SNR of each of the filtered signals. The iFFT module 320 performs an inverse FFT on the filtered signals, generating filtered time domain signals. Using the outputs from the SNR estimate module 318 and the iFFT module 320, it is determined at block 322 whether the SNR for each of the filtered signals is greater than a selected threshold value. If the SNR is above the threshold value, the filtered time domain output signals from the iFFT module 320 are input to a direction of arrival-delay and sum (DOA-DAS) module 324. The SNR estimation module 318 is discussed in further detail with respect to FIG. 4.

The DOA-DAS module 324 receives the filtered time domain signals generated by the iFFT 320, including one signal for each microphone 302*a*-304*f* in the microphone array. The DOA-DAS module 324 includes a voice activity detector that determines which part of the filtered time domain input signal to focus on in determining a DOA for the input signal. Based on a lookup angle, the DOA-DAS module 324 delays input samples in the filtered time domain input signals. In some examples, the DOA-DAS module 324 evaluates the results based on multiple lookup angles to find the lookup angle that generates the highest SNR for the given filtered time domain input signals. The DOA-DAS module 324 outputs the identified lookup angle that generates the highest SNR for the microphone array. The DOA-DAS module 324 is described in greater detail with respect to FIG. 5.

Based on the lookup angle output from the DOA-DAS module 324, the direction of arrival (DOA) is updated at the DOA update module 326. The DOA-DAS module 324 generates a valid output between 0-180 degrees, for the input source to the beamformer 330. In some examples, the output from the DOA-DAS module 324 is validated by a voice activity detection (VAD) module. The VAD generates a binary decision for the current frame to determine if the frame is voice or not voice. If no active voice has been detected, and thus there is no "valid" VAD decision, the DOA-DAS module 324 output is not validated and is not used in the beamforer 330. As shown in FIG. 3, the output from the DOA-DAS module 324 is validated based on the output from block 322, where it was determined whether SNR is greater than a threshold value, and thus whether the signal includes active voice. If the DOA is valid, the filtered frequency domain signals from the high pass filter 316 and the updated DOA are output to a minimum variance distortionless response (MVDR) beamformer 330. If the DOA is not valid, the signals are output to an averaging module 332. In particular, at the averaging module 332, the audio signals from each element of the array are averaged to generate a single channel output. The MVDR beamformer 330 utilizes the estimated DOA output to generate spatial filtering coefficients to filter the signal and create a one channel output. The MVDR beamformer 330 is described in greater detail with respect to FIG. 6.

The output from the MVDR beamformer 330 is input to an inverse FFT 334 to convert the beamformed one channel output to a time domain signal. Note that the output from the MVDR beamformer 330 is a filtered and beamformed signal from one microphone array. The time domain signal output from the iFFT 334 is input to a synthesis module 336. In various examples, the synthesis module 336 includes a weight that is the inverse of the weight used in the analysis window. The synthesis module 336 is applied to a first half length of a current frame output and a second half length of a previous frame output. The synthesis module 336 outputs a processed one channel output 344 for frame [n] for the microphone array 302*a*-302*f*. Thus, as shown in FIG. 3, there is one processed output frame for each microphone array. In particular, for frame [n] from the second microphone array 352, the beamforming system 300 outputs a processed frame [n] 354, for frame [n] from the third microphone array 362, the beamforming system 300 outputs a processed frame [n] 364, and for frame [n] from the fourth microphone array 372, the beamforming system 300 outputs a processed frame [n] 374*n*.

Example Diagram of SNR Estimation for Vehicle Two-Way Communication

Figure 4:
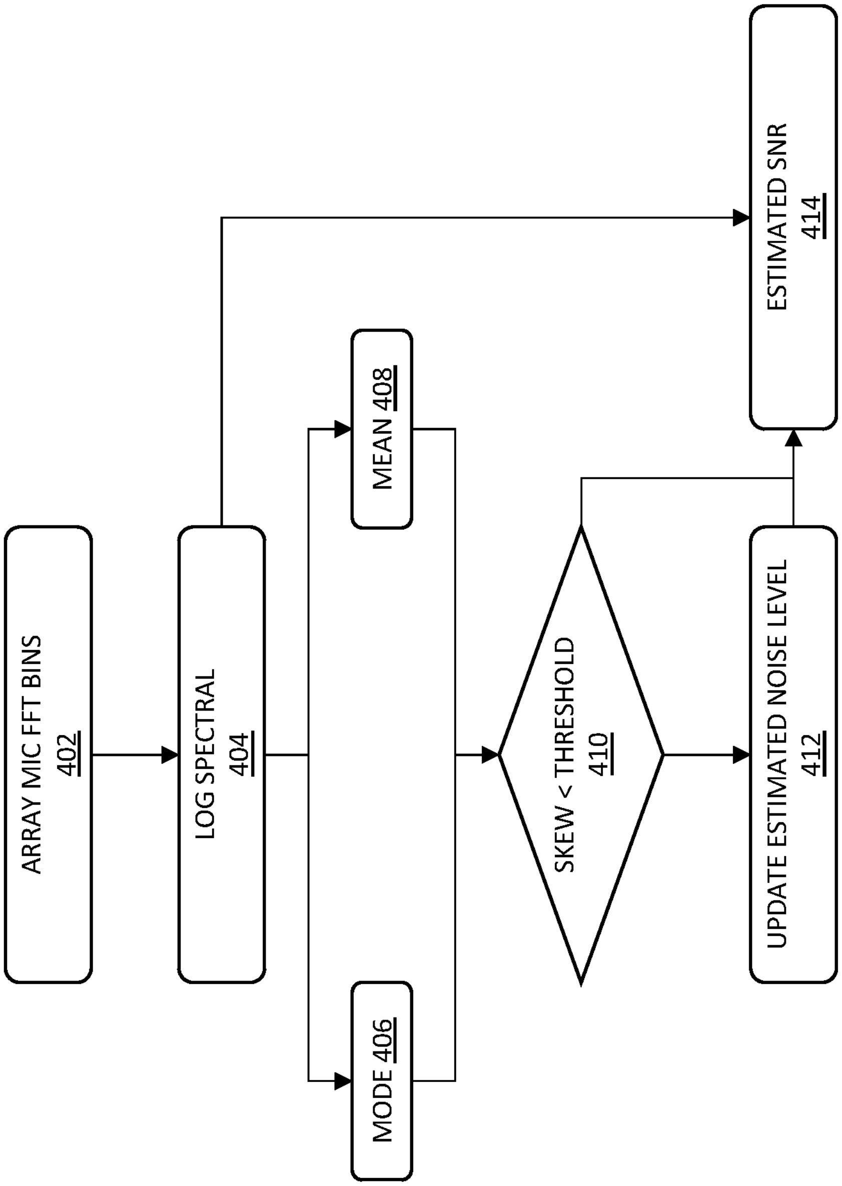
FIG. 4 is a block diagram illustrating an example of a system for SNR estimation, according to some examples of the present disclosure.

FIG. 4 is a block diagram illustrating an example of a system 400 for SNR estimation, according to some examples of the present disclosure. In various examples, SNR estimation is performed on each microphone signal. Thus, for example, with reference to FIG. 3, SNR estimation is performed on each of the six microphone signals in the first microphone array. As described above, an FFT module converts the microphone signal for each microphone 302*a*-302*f* in a first microphone array to the frequency domain, generating respective FFT bins 314*a*-314*f* for each respective microphone. The SNR estimation system 400 estimates SNR for the FFT bins 314*a*-314*f* for each microphone. As described above, each of the FFT bins is based on data from two frames of microphone input.

Thus, the input 402 to the SNR estimation system 400 is the FFT bins (e.g., respective FFT bins 314*a*-314*f*) for a single microphone (e.g., respective microphones 302*a*-302*f*)

of a microphone array. The FFT bins are input to a Log Spectral module 404, which converts the frequency domain spectra of the input FFT bins to a log scale. The mode of the log scale spectral signals is determined at the mode module 406. In some examples, the mode is a value of the log spectral output that has the highest probability of occurrence. In some examples, the mode is the value of the log scale spectral signals that maximizes a probability density function. The mean of the log scale spectral signals is determined at the mean module 408. Based on the mode and the mean, the SNR estimation system 400 determines the skew of the log scale spectral signals. At block 410, the skew is compared to a threshold value to determine whether the signal is noise. If, at block 410, the skew is less than the threshold, at block 412, the estimated noise level is updated.

At block 414, an estimated SNR is generated, based on the log spectral signals from block 404, the comparison of the skew and the threshold at block 410, and the updated estimated noise level 412. The estimated SNR from block 414 is output from the SNR estimation system 404. With respect to FIG. 3, the estimated SNR from block 414 is output from the SNR estimate block 318.

Example Diagram of a DOA-DAS for Vehicle Two-Way Communication

Figure 5:
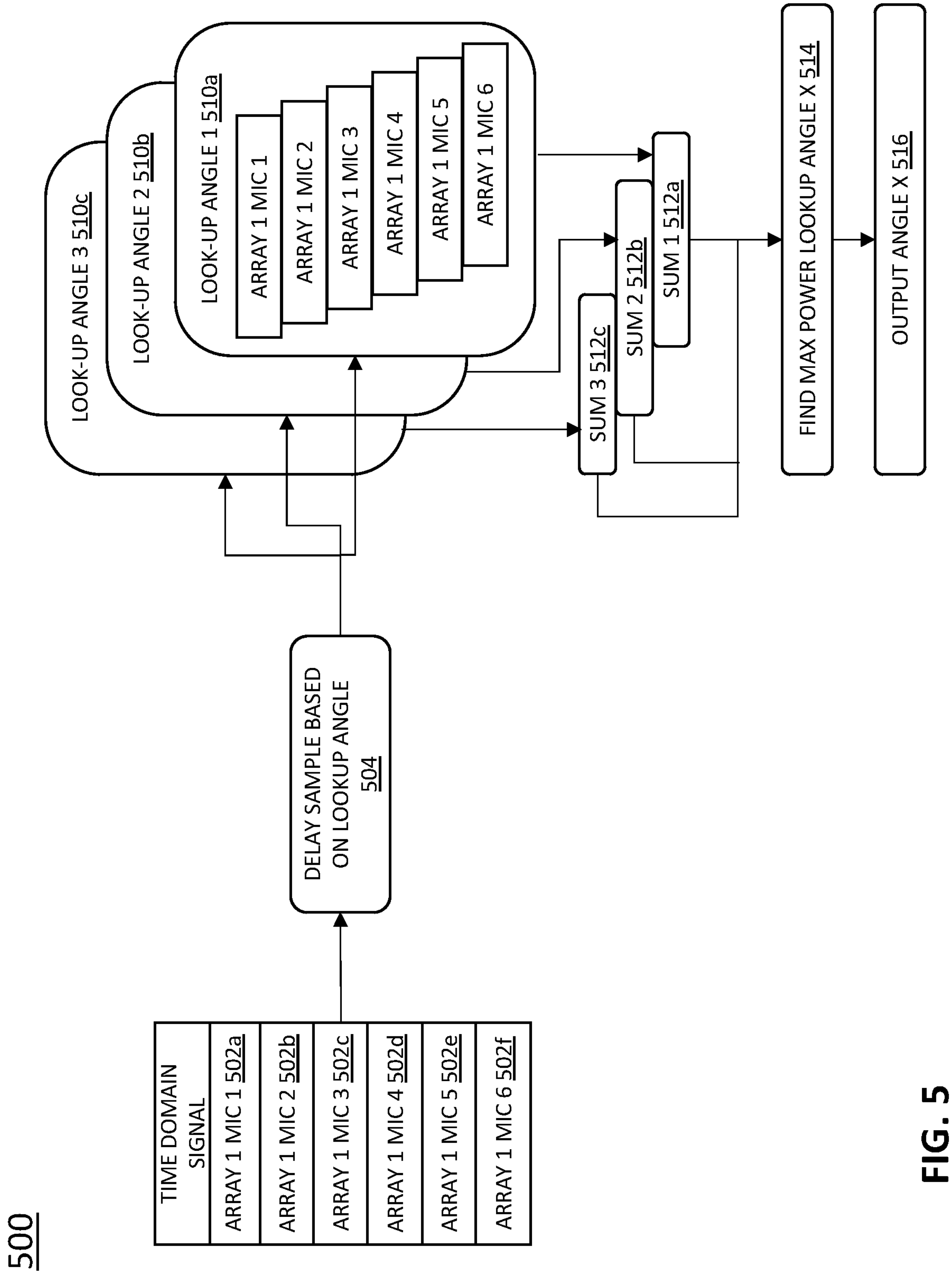
FIG. 5 is a block diagram illustrating a direction of arrival (DOA) system, according to some examples of the present disclosure.

FIG. 5 is a block diagram illustrating a direction of arrival (DOA) system 500, according to some examples of the present disclosure. In particular, the DOA system 500 estimates the DOA of the signals received at a microphone array. The output angle from the DOA system 500 is the angle that generates the highest SNR for the microphone array output. Thus, the DOA system 500 illustrates the DOA estimation for one microphone array including multiple microphones. In various examples, for a vehicle including four microphone arrays, the DOA system 500 outputs four DOA estimations: one DOA estimation for each microphone array.

As shown in FIG. 5, the DOA system 500 receives a time domain signal 502*a*-502*f* from each of the microphones in a microphone array. In some examples, the time domain signals 502*a*-502*f*. The DOA system 500 generates a signal output sum for each of multiple possible angles. In some examples, the DOA system 500 considers angles between 0 degrees and 180 degrees. Thus, in some examples, the DOA system 500 generates multiple possible signal output sums for multiple respective possible angles. At delay block 504, samples of the time domain signals 502*a*-502*f* are delayed based on the selected look-up angle at each of the lookup angle blocks 510*a*, 510*b*, 510*c*. The delay block 504 outputs respective delayed samples of the time domain signals 502*a*-502*f* to respective look-up angle blocks 510*a*, 510*b*, 510*c*. In some examples, the delay block 504 uses a look-up table to determine the delay for each respective look-up angle block 510*a*, 510*b*.

The first look-up angle block 510*a* generates a signal output for each delayed time domain signal based on a first look-up angle, the second look-up angle block 510*b* generates a signal output for each delayed time domain signal based on a second look-up angle, and the third look-up angle block 510*c* generates a signal output for each delayed time domain signal based on a third look-up angle. While FIG. 5 illustrates a DOA system 500 in which three look-up angles 510*a*, 510*b*, 510*c* are evaluated, in various implementations, any number of look-up angles can be evaluated in the DOA system 500.

Each of the look-up angle blocks 510*a*, 510*b*, 510*c* identifies a maximum sum for the delayed time domain signals of each microphone in the array, and outputs a respective sum 512*a*, 512*b*, 512*c*. At block 514, the sums 512*a*, 512*b*, 512*c* are evaluated to identify the look-up angle corresponding to the sum 512*a*, 512*b*, 512*c* having the most power. The identified look-up angle is the output angle x. At the output angle block 516, the DOA system 500 outputs the output angle x. Note that the output angle x may not match the actual DOA of the speech signal, but the output angle x is the DOA angle that generates the highest SNR for the microphone array.

Example Beamformer for Vehicle Two-Way Communication

Figure 6:
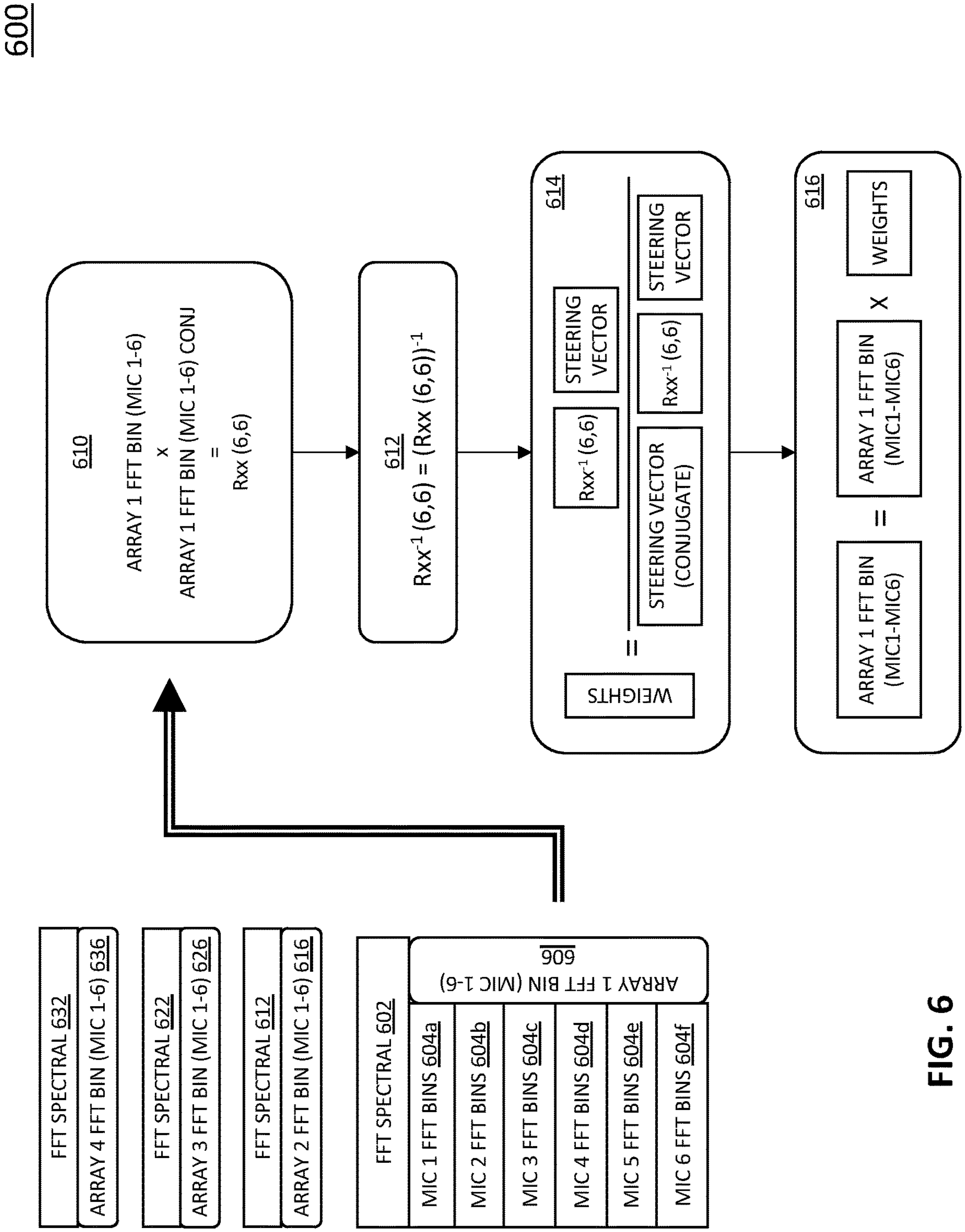
FIG. 6 is a block diagram illustrating a beamforming system, according to some examples of the present disclosure.

FIG. 6 is a block diagram illustrating a beamforming system 600, according to some examples of the present disclosure. In some examples, the beamforming system 600 is a minimum variance distortionless response (MVDR) beamformer, and the beamforming system 600 generates a one channel output. In some examples, the beamforming system 600 generates a one channel output for each microphone array. In some examples, the beamforming system 600 is used for the MVDR beamformer 330 of FIG. 3.

The beamforming system 600 receives an array of FFT bins 606, including the FFT bins 604*a*-604*f* for each microphone in a microphone array. The FFT bins 604*a*-604*f* each include a frequency domain spectral signal. At block 610, the array of FFT bins 606 is multiplied by a conjugate of the array of FFT bins 606 to generate a covariance matrix Rxx (6,6). In various examples, the covariance matrix Rxx (6,6) is a signal covariance matrix. At block 612, a matrix inversion operation is performed on the covariance matrix Rxx (6,6) to generate the inverted covariance matrix $Rxx^{-1}(6,6)$. In some examples, a frequency dependent Cholesky decomposition is used for the matrix inversion, where the frequency dependent Cholesky decomposition is based on human voice frequency range characteristics as well as microphone array system bandwidth. In some examples, the Cholesky decomposition is an efficient numerical solution for matrix inversion. Matrix inversion is performed for each frequency bin on each microphone array and is used to determine the beamformer weight, where the beamformer weight is a N-by-1 vector for each frequency bin, and N is the number of microphones in the microphone array. Thus, matrix inversion can be computationally demanding, and in some examples, the matrix inversion is the most computationally demanding portion of the beamforming system 600. In some examples, matrix inversion can be limited to frequencies related to human voice and speech, as well as to microphone hardware bandwidth.

At block 614, array weighting coefficients are generated based on the inverted covariance matrix $Rxx^{-1}(6,6)$. In particular, the inverted covariance matrix $Rxx^{-1}(6,6)$ is multiplied by a steering vector, and the result is divided by the product of a steering vector conjugate, the inverted covariance matrix $Rxx^{-1}(6,6)$, and the steering vector. In some examples, the steering vectors are generated based estimated DOAs. In some examples, at block 614, weights on the audio signal of each array element are determined so the beam from the array aligns with the DOA, while audio from other directions is removed. According to some examples, the weighting coefficients differentiate human voice from ambient noise. In some examples, in the low-mid range (e.g., 500 Hz-4 kHz), the algorithm in block 614 performs the matrix inversion for every other frequency bin, where the number of frequency bins is determined by the number of points used in the Fast Fourier Transform (FFT). In the very low frequency range (e.g., <500 Hz) and in the high frequency (e.g., >4 kHz), the algorithm in block 614 uses a set of constant weight coefficients from matrix inversion at a representative frequency bin. In various examples, the very low frequency range and the high frequency range contribute little to speech enhancement, while the low-mid range frequencies contribute significantly to speech enhancement. In various examples, the weighting coefficients are spatial filtering coefficients.

At block 616, the array of FFT bins 606 is multiplied by the weights generated at block 614 to generate a beamforming system 600 output. According to various implementations, the beamforming system 600 can perform real-time beamforming.

Example of an Autonomous Vehicle Fleet

Figure 7:
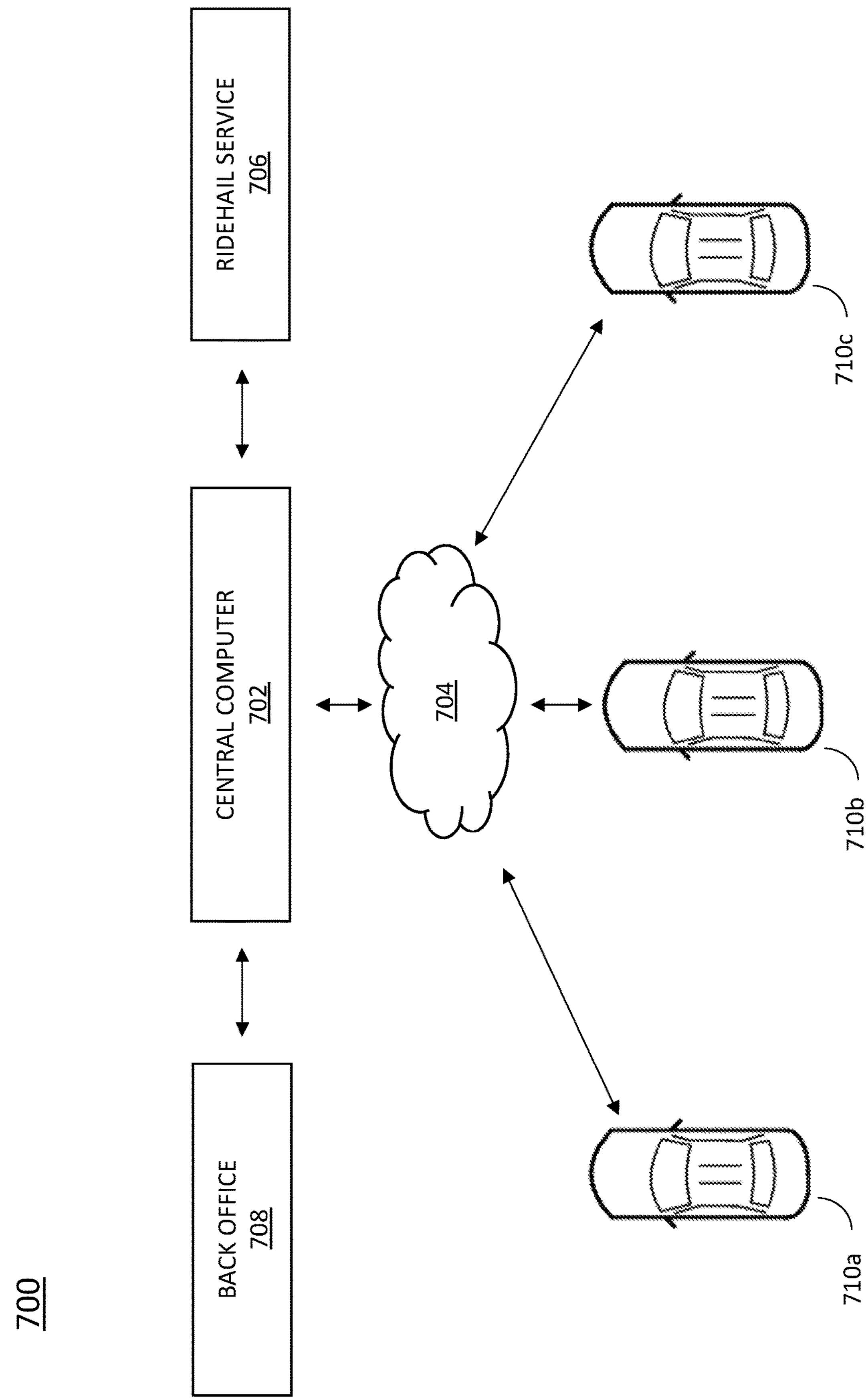
FIG. 7 is a diagram illustrating a fleet of autonomous vehicles in communication with a central computer, according to some examples of the present disclosure.

FIG. 7 is a diagram 700 illustrating a fleet of autonomous vehicles 710*a*, 710*b*, 710*c* in communication with a central computer 702, according to some embodiments of the disclosure. The vehicles 710*a*-710*c* communicate wirelessly with a cloud 704 and a central computer 702. The central computer 702 includes a routing coordinator and a database of information from the vehicles 710*a*-710*c* in the fleet. Autonomous vehicle fleet routing refers to the routing of multiple vehicles in a fleet. The central computer also acts as a centralized ride management system and communicates with ridehail users via a ridehail service 706. In various examples, the ridehail service 706 includes a rideshare service (and rideshare users) as well as an autonomous vehicle delivery service. Via the ridehail service 706, the central computer receives ride requests from various user ridehail applications. In some implementations, the ride requests include a pick-up location, a drop-off location, and/or an intermediate stopping location. In some implementations, a delivery request includes vehicle access locations for delivery pick-up and for delivery drop-off. In some implementations, the autonomous vehicles 710*a*-710*c* communicate directly with each other. Each received ride request and delivery request can be assigned, by the central computer 702, to a vehicle in the fleet.

In various examples, the autonomous vehicles 710*a*-710*c* include exterior microphones, and individuals outside the autonomous vehicles 710*a*-710*c* can communicate with a back office 708 via the central computer 702. In particular, an individual standing outside one of the autonomous vehicles 710*a*-710*c* can use the 2-way communication system described herein to communicate with a remote assistant and/or back office 708. In various examples, the individual at exterior of the vehicle 710*a*-710*c* may be an emergency personnel such as a police officer, fire fighter, emergency medical services provider, or other individual.

When a ride request is entered at a ridehail service 706, the ridehail service 706 sends the request to the central computer 702. In some examples, during a selected period of time before the ride begins, the vehicle to fulfill the request is selected and a route for the vehicle is generated by the routing coordinator. In other examples, the vehicle to fulfill the request is selected and the route for the vehicle is generated by the onboard computer on the autonomous vehicle. The route can be based on the vehicle's current stop location and/or based on a planned stop location for the vehicle at the end of a current route. In various examples, information pertaining to the ride is transmitted to the selected vehicle 710*a*-710*c*. With shared rides, the route for the vehicle can depend on other passenger pick-up and drop-off locations.

As described above, each vehicle 710*a*-710*c* in the fleet of vehicles communicates with a routing coordinator. Thus, information gathered by various autonomous vehicles 710*a*-710*c* in the fleet can be saved and used to generate information for future routing determinations. For example, sensor data can be used to generate route determination parameters. In general, the information collected from the vehicles in the fleet can be used for route generation or to modify existing routes. For example, information regarding emergency vehicles stopped in a selected area and requesting a vehicle move from a stop location in the area can be communicated to the routing coordinator and used to generate routes and modify existing routes to avoid the selected area for a selected period of time. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computer 702 generates a route for each selected autonomous vehicle 710*a*-710*c*, and the routing coordinator determines a route for the autonomous vehicle 710*a*-710*c* to travel from the autonomous vehicle's current location to a first destination.

Example Autonomous Vehicle Management System

Figure 8:
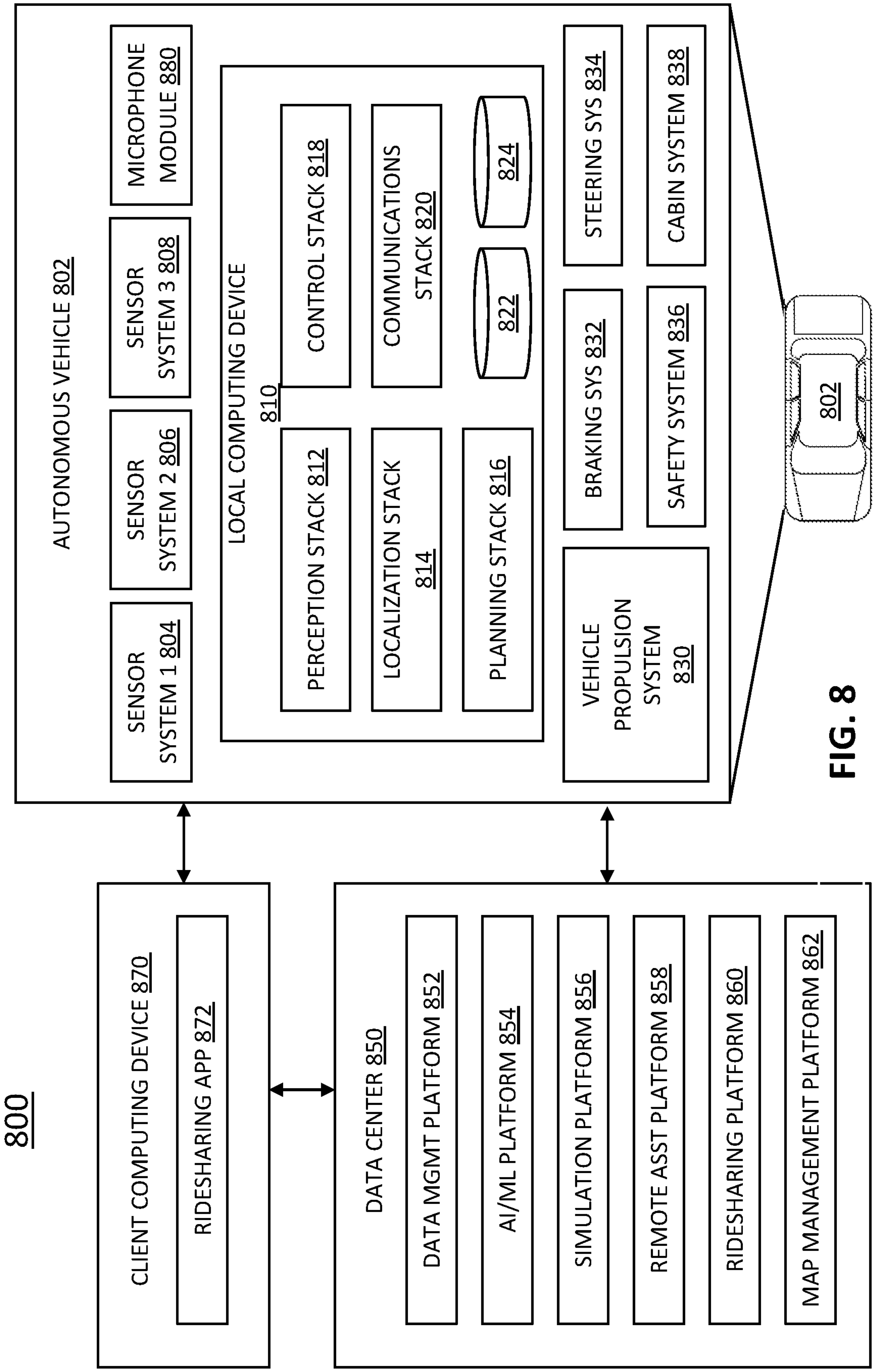
FIG. 8 shows an example embodiment of a system for implementing certain aspects of the present technology.

Turning now to FIG. 8, this figure illustrates an example of an AV management system 800. One of ordinary skill in the art will understand that, for the AV management system 800 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 802, a data center 850, and a client computing device 870. The AV 802, the data center 850, and the client computing device 870 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 802 can navigate about roadways without a human driver based on sensor signals generated by multiple sensor systems 804, 806, and 808. The sensor systems 804-808 can include different types of sensors and can be arranged about the AV 802. For instance, the sensor systems 804-808 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 can be a camera system, the sensor system 806 can be a LIDAR system, and the sensor system 808 can be a RADAR system. Other embodiments may include any other number and type of sensors. In various examples, the sensor systems can be used to provide surveillance of the environment surrounding the vehicle. In some examples, the vehicle two-way communication module can use vehicle sensor data to observe the surrounding environment and identify exterior communication scenarios for two-way communication when the vehicle is stopped. The AV 802 can also include a microphone module 880, which can include a processing system as described herein for processing microphone array signals from an exterior of the vehicle and transmitting processed signals to a back office.

AV 802 can also include several mechanical systems that can be used to maneuver or operate AV 802. For instance, the mechanical systems can include vehicle propulsion system 830, braking system 832, steering system 834, safety system 836, and cabin system 838, among other systems. Vehicle propulsion system 830 can include an electric motor, an internal combustion engine, or both. The braking system 832 can include an engine brake, a wheel braking system (e.g., a disc braking system that utilizes brake pads), hydraulics, actuators, and/or any other suitable componentry configured to assist in decelerating AV 802. The steering system 834 can include suitable componentry configured to control the direction of movement of the AV 802 during navigation. Safety system 836 can include lights and signal indicators, a parking brake, airbags, and so forth. The cabin system 838 can include cabin temperature control systems, in-cabin entertainment systems, and so forth. In some embodiments, the AV 802 may not include human driver actuators (e.g., steering wheel, handbrake, foot brake pedal, foot accelerator pedal, turn signal lever, window wipers, etc.) for controlling the AV 802. Instead, the cabin system 838 can include one or more client interfaces (e.g., Graphical User Interfaces (GUIs), Voice User Interfaces (VUIs), etc.) for controlling certain aspects of the mechanical systems 830-838.

AV 802 can additionally include a local computing device 810 that is in communication with the sensor systems 804-808, the mechanical systems 830-838, the data center 850, and the client computing device 870, among other systems. The local computing device 810 can include one or more processors and memory, including instructions that can be executed by the one or more processors. The instructions can make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a mapping and localization stack 814, a planning stack 816, a control stack 818, a communications stack 820, a High Definition (HD) geospatial database 822, and an AV operational database 824, among other stacks and systems.

Perception stack 812 can enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception stack 812 can detect and classify objects and determine their current and predicted locations, speeds, directions, and the like. In addition, the perception stack 812 can determine the free space around the AV 802 (e.g., to maintain a safe distance from other objects, change lanes, park the AV, etc.). The perception stack 812 can also identify environmental uncertainties, such as where to look for moving objects, flag areas that may be obscured or blocked from view, and so forth. The perception stack 812 can be used by the microphone processing module to sense the vehicle environment and identify scenarios in which an exterior person attempts to initiate a two-way communication.

Mapping and localization stack 814 can determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 802 can compare sensor data captured in real-time by the sensor systems 804-808 to data in the HD geospatial database 822 to determine its precise (e.g., accurate to the order of a few centimeters or less) position and orientation. The AV 802 can focus its search based on sensor data from one or more first sensor systems (e.g., GPS) by matching sensor data from one or more second sensor systems (e.g., LIDAR). If the mapping and localization information from one system is unavailable, the AV 802 can use mapping and localization information from a redundant system and/or from remote data sources.

The planning stack 816 can determine how to maneuver or operate the AV 802 safely and efficiently in its environment. For example, the planning stack 816 can receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 802 from one point to another. The planning stack 816 can determine multiple sets of one or more mechanical operations that the AV 802 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 816 can select from multiple backup plans to carry out. For example, while preparing to change lanes to turn right at an intersection, another vehicle may aggressively cut into the destination lane, making the lane change unsafe. The planning stack 816 could have already determined an alternative plan for such an event, and upon its occurrence, help to direct the AV 802 to go around the block instead of blocking a current lane while waiting for an opening to change lanes.

The control stack 818 can manage the operation of the vehicle propulsion system 830, the braking system 832, the steering system 834, the safety system 836, and the cabin system 838. The control stack 818 can receive sensor signals from the sensor systems 804-808 as well as communicate with other stacks or components of the local computing device 810 or a remote system (e.g., the data center 850) to effectuate operation of the AV 802. For example, the control stack 818 can implement the final path or actions from the multiple paths or actions provided by the planning stack 816. This can involve turning the routes and decisions from the planning stack 816 into commands for the actuators that control the AV's steering, throttle, brake, and drive unit.

The communication stack 820 can transmit and receive signals between the various stacks and other components of the AV 802 and between the AV 802, the data center 850, the client computing device 870, and other remote systems. The communication stack 820 can enable the local computing device 810 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 820 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 822 can store HD maps and related data of the streets upon which the AV 802 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 824 can store raw AV data generated by the sensor systems 804-808 and other components of the AV 802 and/or data received by the AV 802 from remote systems (e.g., the data center 850, the client computing device 870, etc.). In some embodiments, the raw AV data can include HD LIDAR point cloud data, image or video data, RADAR data, GPS data, and other sensor data that the data center 850 can use for creating or updating AV geospatial data as discussed further below with respect to FIG. 5 and elsewhere in the present disclosure.

The data center 850 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 850 can include one or more computing devices remote to the local computing device 810 for managing a fleet of AVs and AV-related services. For example, in addition to managing the AV 802, the data center 850 may also support a ridesharing service, a delivery service, a remote/roadside assistance service, street services (e.g., street mapping, street patrol, street cleaning, street metering, parking reservation, etc.), and the like.

The data center 850 can send and receive various signals to and from the AV 802 and the client computing device 870. These signals can include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a simulation platform 856, a remote assistance platform 858, a ridesharing platform 860, and a map management platform 862, among other systems.

Data management platform 852 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 850 can access data stored by the data management platform 852 to provide their respective services.

The AI/ML platform 854 can provide the infrastructure for training and evaluating machine learning algorithms for operating the AV 802, the simulation platform 856, the remote assistance platform 858, the ridesharing platform 860, the map management platform 862, and other platforms and systems. Using the AI/ML platform 854, data scientists can prepare data sets from the data management platform 852; select, design, and train machine learning models; evaluate, refine, and deploy the models; maintain, monitor, and retrain the models; and so on.

The simulation platform 856 can enable testing and validation of the algorithms, machine learning models, neural networks, and other development efforts for the AV 802, the remote assistance platform 858, the ridesharing platform 860, the map management platform 862, and other platforms and systems. The simulation platform 856 can replicate a variety of driving environments and/or reproduce real-world scenarios from data captured by the AV 802, including rendering geospatial information and road infrastructure (e.g., streets, lanes, crosswalks, traffic lights, stop signs, etc.) obtained from the map management platform 862; modeling the behavior of other vehicles, bicycles, pedestrians, and other dynamic elements; simulating inclement weather conditions, different traffic scenarios; and so on.

The remote assistance platform 858 can generate and transmit instructions regarding the operation of the AV 802. For example, in response to an output of the AI/ML platform 854 or other system of the data center 850, the remote assistance platform 858 can prepare instructions for one or more stacks or other components of the AV 802.

The ridesharing platform 860 can interact with a customer of a ridesharing service via a ridesharing application 872 executing on the client computing device 870. The client computing device 870 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 872. The client computing device 870 can be a customer's mobile computing device or a computing device integrated with the AV 802 (e.g., the local computing device 810). The ridesharing platform 860 can receive requests to be picked up or dropped off from the ridesharing application 872 and dispatch the AV 802 for the trip.

Map management platform 862 can provide a set of tools for the manipulation and management of geographic and spatial (geospatial) and related attribute data. The data management platform 852 can receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data can be processed, and map management platform 862 can render base representations (e.g., tiles (2D), bounding volumes (3D), etc.) of the AV geospatial data to enable users to view, query, label, edit, and otherwise interact with the data. Map management platform 862 can manage workflows and tasks for operating on the AV geospatial data. Map management platform 862 can control access to the AV geospatial data, including granting or limiting access to the AV geospatial data based on user-based, role-based, group-based, task-based, and other attribute-based access control mechanisms. Map management platform 862 can provide version control for the AV geospatial data, such as to track specific changes that (human or machine) map editors have made to the data and to revert changes when necessary. Map management platform 862 can administer release management of the AV geospatial data, including distributing suitable iterations of the data to different users, computing devices, AVs, and other consumers of HD maps. Map management platform 862 can provide analytics regarding the AV geospatial data and related data, such as to generate insights relating to the throughput and quality of mapping tasks.

In some embodiments, the map viewing services of map management platform 862 can be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ridesharing platform 860 may incorporate the map viewing services into the client application 872 to enable passengers to view the AV 802 in transit en route to a pick-up or drop-off location, and so on.

Example Method for Exterior Vehicle Two-Way Communication

Figure 9:
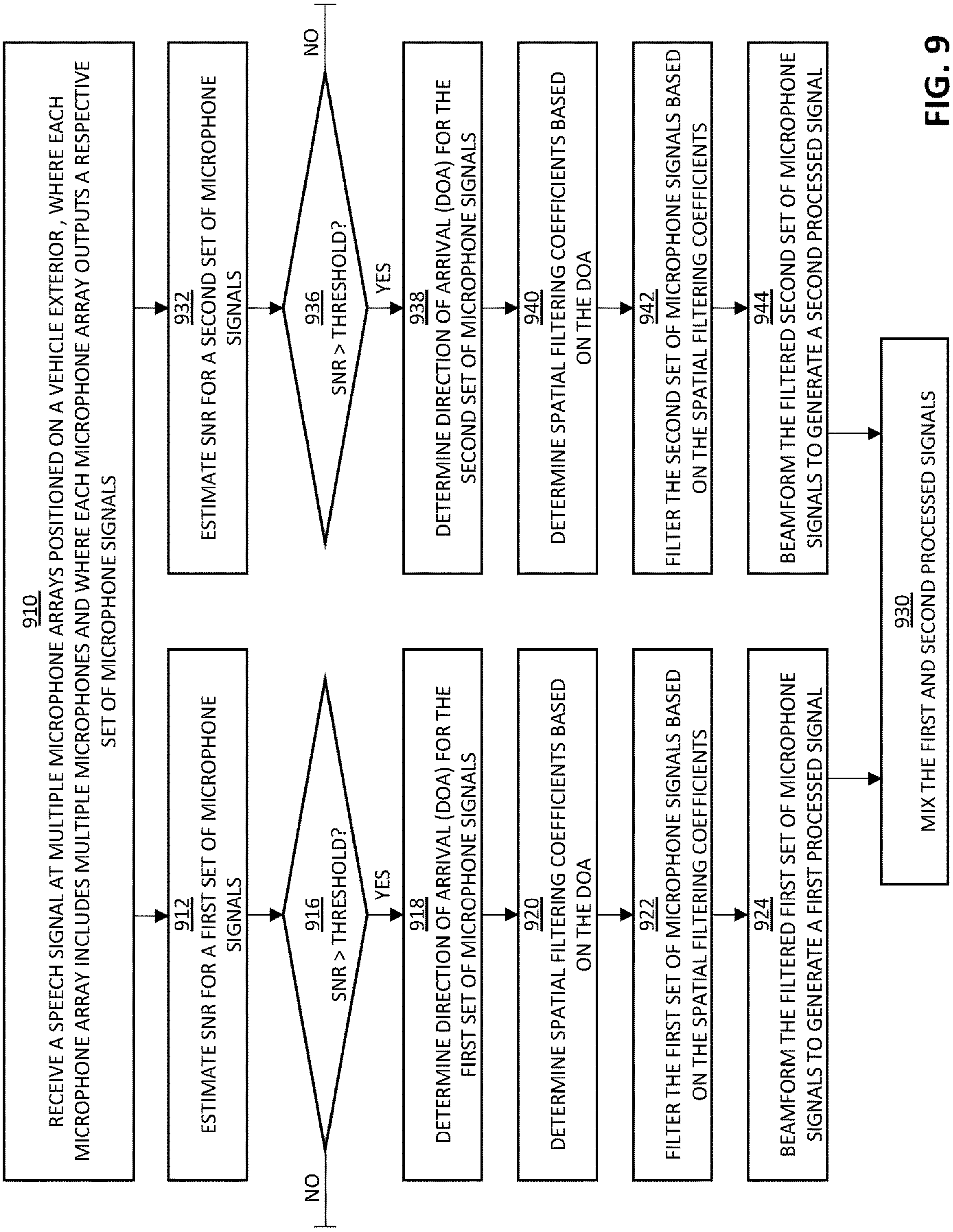
FIG. 9 shows a flow diagram illustrating an example of a method for processing microphone signals from a vehicle exterior for vehicle two-way communication, according to some examples of the present disclosure.

FIG. 9 shows a flow diagram illustrating an example of a method 900 for processing microphone signals from a vehicle exterior for vehicle two-way communication, according to some examples of the disclosure. At step 910, a speech signal is received at multiple microphone arrays on the vehicle exterior. As discussed, for example, with respect to FIGS. 1A and 1B, a vehicle exterior can include multiple microphone arrays. An individual positioned outside the vehicle can communicate with a back office via the exterior microphone arrays. Each microphone array includes multiple microphones, and each microphone array outputs a plurality of microphone signals. In particular, each microphone array outputs a microphone signal for each of the microphones comprising the microphone array. Thus, a microphone array including six microphones outputs six microphone signals, and the six microphone signals are a set of signals for the microphone array. As described above with respect to FIGS. 2-6, the microphone signals for each microphone array are processed together. In particular, multiple frames from each microphone signal for each microphone array are processed together.

In the example method 900 of FIG. 9, two sets of microphone signals are processed. In other examples, more than two sets of microphone signals can be processed. For example, a vehicle can include four microphone arrays, and four sets of microphone signals can be processed. In various examples, each set of microphone signals can be processed in parallel. In some examples, each set of microphone signals can be processed serially. While FIG. 9 shows the first set of signals processed in parallel with the second set of signals, the first and second sets of signals can also be processed serially.

At step 912, the SNR for a first set of microphone signals is determined. At step 916, it is determined if the SNR is above a threshold. If the SNR is below the threshold, the method 900 can end for the first set of microphone signals. In some examples, however, the method 900 can continue for the second set of microphone signals if the SNR for the second set of microphone signals is above the threshold at step 936. If the SNR at step 916 is above the threshold, the method 900 proceeds to step 918 and determines the direction of arrival (DOA) for the first set of microphone signals. Determination of DOA is discussed above with respect to FIGS. 3 and 5.

At step 920, spatial filtering coefficients for the first set of microphone signals are determined based on the DOA. The spatial filtering coefficients can be the weighting coefficients or weights as discussed above with respect to FIG. 6. At step 922, the first set of microphone signals is filtered based on the spatial filtering coefficients. At step 924, the first filtered set of microphone signals from step 922 is beamformed to generate a first one channel processed signal.

At step 932, the SNR for a second set of microphone signals is determined. At step 936, it is determined if the SNR is above a threshold. If the SNR is below the threshold, the method 900 can end for the second set of microphone signals. In some examples, however, the method 900 can continue for the first set of microphone signals if the SNR for the first set of microphone signals is above the threshold at step 916. If the SNR at step 936 is above the threshold, the method 900 proceeds to step 938 and determines the direction of arrival (DOA) for the second set of microphone signals. Determination of DOA is discussed above with respect to FIGS. 3 and 5.

At step 940, spatial filtering coefficients for the second set of microphone signals are determined based on the DOA. The spatial filtering coefficients can be the weighting coefficients or weights as discussed above with respect to FIG. 6. At step 942, the second set of microphone signals is filtered based on the spatial filtering coefficients. At step 944, the second filtered set of microphone signals from step 942 is beamformed to generate a second one channel processed signal.

At step 930, the first one channel processed signal is mixed with the second one channel processed signal to generate a single channel output signal.

Example of a Computing System for Two-Way Communication Module

Figure 10:
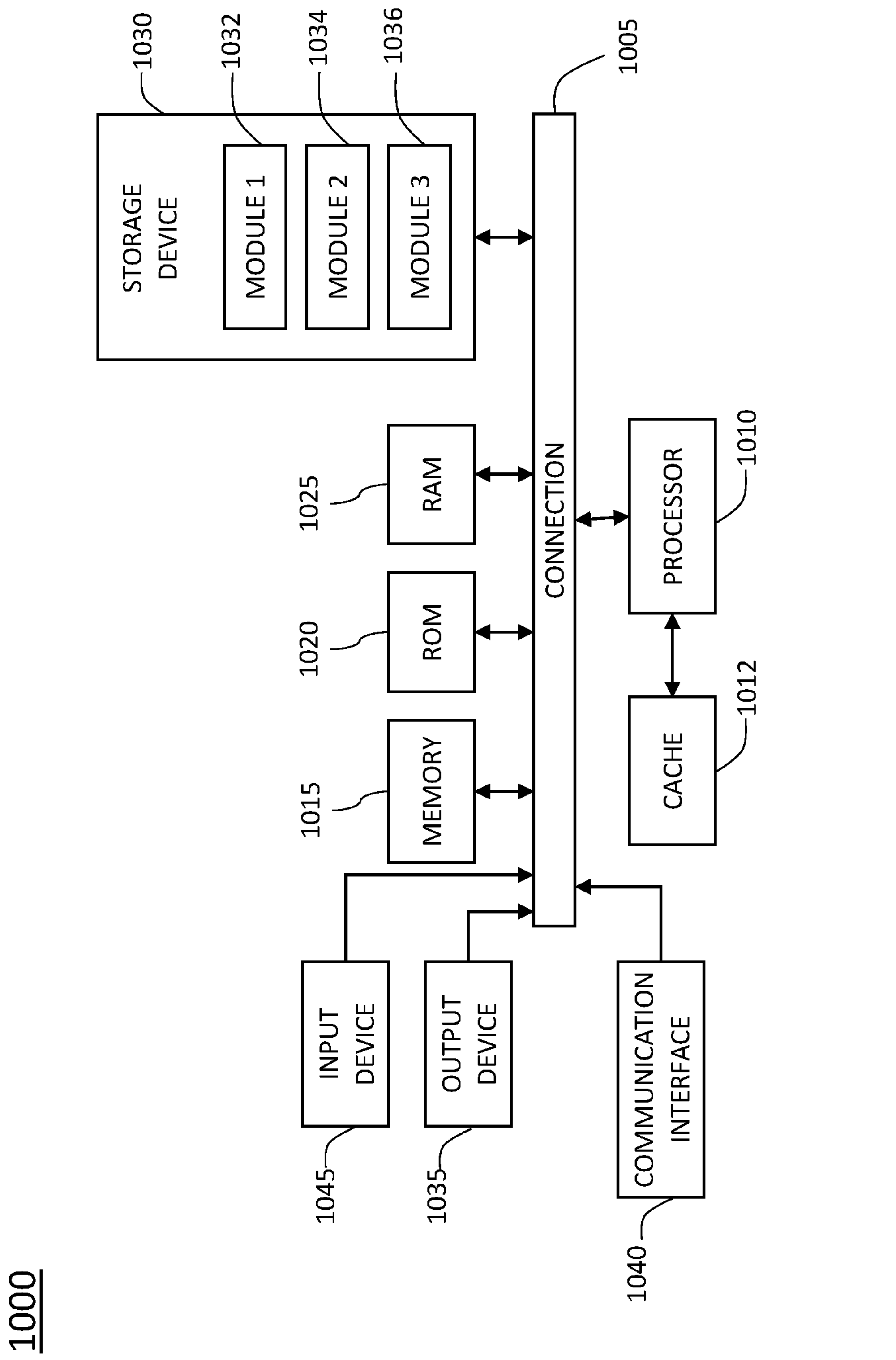
FIG. 10 shows an example embodiment of a computing system for implementing certain aspects of the present technology.

FIG. 10 shows an example embodiment of a computing system 1000 for implementing certain aspects of the present technology. In various examples, the computing system 1000 can be any computing device making up the onboard computer 104, the central computer 702, or any other computing system described herein. The computing system 1000 can include any component of a computing system described herein which the components of the system are in communication with each other using connection 1005. The connection 1005 can be a physical connection via a bus, or a direct connection into processor 1010, such as in a chipset architecture. The connection 1005 can also be a virtual connection, networked connection, or logical connection.

In some implementations, the computing system 1000 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices. For example, the components can include a simulation system, an artificial intelligence system, a machine learning system, and/or a neural network.

The example system 1000 includes at least one processing unit (central processing unit (CPU) or processor) 1010 and a connection 1005 that couples various system components including system memory 1015, such as read-only memory (ROM) 1020 and random access memory (RAM) 1025 to processor 1010. The computing system 1000 can include a cache of high-speed memory 1012 connected directly with, in close proximity to, or integrated as part of the processor 1010.

The processor 1010 can include any general-purpose processor and a hardware service or software service, such as services 1032, 1034, and 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric. In some examples, a service 1032, 1034, 1036 is a two-way communication module, and is configured to detect environmental changes and identify changes that initiate a two-way communication situation. The two-way communication module can include a machine learning model for identifying two-way communication situations.

To enable user interaction, the computing system 1000 includes an input device 1045, which can represent any number of input mechanisms, such as a microphone for speech, a touch-sensitive screen for gesture or graphical input, keyboard, mouse, motion input, speech, etc. The computing system 1000 can also include an output device 1035, which can be one or more of a number of output mechanisms known to those of skill in the art. In some instances, multimodal systems can enable a user to provide multiple types of input/output to communicate with the computing system 1000. The computing system 1000 can include a communications interface 1040, which can generally govern and manage the user input and system output. There is no restriction on operating on any particular hardware arrangement, and therefore the basic features here may easily be substituted for improved hardware or firmware arrangements as they are developed.

A storage device 1030 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROMs, and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as a processor 1010, a connection 1005, an output device 1035, etc., to carry out the function.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a system for two-way communication from a vehicle exterior, comprising: a vehicle, including: a plurality of microphone arrays to receive a speech signal, wherein each microphone array includes a plurality of microphones positioned on a vehicle exterior each configured to receive the speech signal, wherein each microphone array outputs a respective plurality of microphone signals; a processing pipeline to process the respective plurality of microphone signals for each microphone array including: a signal-to-noise ratio (SNR) estimator to estimate a SNR for the respective plurality of microphone signals, and to determine the SNR is above a selected threshold, a voice activity detector to determine a direction of arrival of the respective plurality of microphone signals, wherein the direction of arrival is an angle for which a sum of the plurality of microphone signals has a maximum identified power, a beamformer to: determine spatial filtering coefficients based on the angle, filter the respective plurality of microphone signals based on the spatial filtering coefficients to generate a respective plurality of filtered signals, and beamform the respective plurality of filtered signals to generate a respective processed signal; and a mixer to mix the respective processed signal from each microphone array with other respective processed signals from the plurality of microphone arrays and generate an output signal; and a central computer configured to: receive the output signal, and transmit the output signal to a back office.

Example 2 provides a method, system, and/or vehicle according to one or more of the preceding and/or following examples, wherein the vehicle further comprises a transmitter to transmit the output signal to the central computer for communication with the back office.

Example 3 provides a method, system, and/or vehicle according to one or more of the preceding and/or following examples, wherein the plurality of microphone arrays include a first microphone array and a second microphone array, wherein the respective plurality of microphone signals include a first plurality of microphone signals and a second plurality of microphone signals, wherein the direction of arrival of the first plurality of microphone signals is a first direction of arrival and the direction of arrival of the second plurality of microphone signals is a second direction of arrival, and wherein the first direction of arrival is different from the second direction of arrival.

Example 4 provides a method, system, and/or vehicle according to one or more of the preceding and/or following examples, wherein the processing pipeline further comprises a Fast Fourier transform to convert the respective plurality of microphone signals to a plurality of frequency domain bins, and a high pass filter to filter the plurality of frequency domain bins and remove low frequency noise and output a plurality of filtered frequency domain bins.

Example 5 provides a method, system, and/or vehicle according to one or more of the preceding and/or following examples, wherein the SNR estimator receives the plurality of filtered frequency domain bins and estimates the SNR for the plurality of filtered frequency domain bins.

Example 6 provides a method, system, and/or vehicle according to one or more of the preceding and/or following examples, wherein the beamformer is a minimum variance distortionless response beamformer, and wherein the beamformer receives the filtered frequency domain bins and filters the filtered frequency domain bins to generate the respective plurality of filtered signals.

Example 7 provides a method, system, and/or vehicle according to one or more of the preceding and/or following examples, wherein the angle is an identified angle, and wherein the processing pipeline further comprises an inverse Fast Fourier transform to convert the plurality of filtered frequency domain bins to a plurality of filtered time domain bins, and wherein the voice activity detector is further configured to: receive the plurality of filtered time domain bins, add a first delay to each of the plurality of time domain bins based on a first lookup angle and generate a first sum of first time delayed bins, the first sum having a first power value, add a second delay to each of the plurality of time domain bins based on a second lookup angle and generate a second sum of second time delayed bins, the second sum having a second power value, and determine that the first power value is greater than the second power value, wherein the identified angle is the first lookup angle.

Example 8 provides a vehicle for exterior two-way communications, comprising: a plurality of microphone arrays to receive a speech signal, wherein each microphone array includes a plurality of microphones positioned on a vehicle exterior each configured to receive the speech signal, wherein each microphone array outputs a respective plurality of microphone signals; a processing pipeline to process the respective plurality of microphone signals for each microphone array including: a signal-to-noise ratio (SNR) estimator to estimate a SNR for the respective plurality of microphone signals, and to determine the SNR is above a selected threshold, a voice activity detector to determine a direction of arrival of the respective plurality of microphone signals, wherein the direction of arrival is an angle for which a sum of the plurality of microphone signals has a maximum identified power, a beamformer to: determine spatial filtering coefficients based on the angle, filter the respective plurality of microphone signals based on the spatial filtering coefficients to generate a respective plurality of filtered signals, and beamform the respective plurality of filtered signals to generate a respective processed signal; and a mixer to mix the respective processed signal from each microphone array with other respective processed signals from the plurality of microphone arrays and generate an output signal.

Example 9 provides a method, system, and/or vehicle according to one or more of the preceding and/or following examples, further comprising a transmitter to transmit the output signal to a back office for communication with a remote assistant.

Example 10 provides a method, system, and/or vehicle according to one or more of the preceding and/or following examples, wherein the plurality of microphone arrays include a first microphone array and a second microphone array, wherein the respective plurality of microphone signals include a first plurality of microphone signals and a second plurality of microphone signals, wherein the direction of arrival of the first plurality of microphone signals is a first direction of arrival and the direction of arrival of the second plurality of microphone signals is a second direction of arrival, and wherein the first direction of arrival is different from the second direction of arrival.

Example 11 provides a method, system, and/or vehicle according to one or more of the preceding and/or following examples, wherein the processing pipeline further comprises a Fast Fourier transform to convert the respective plurality of microphone signals to a plurality of frequency domain bins, and a high pass filter to filter the plurality of frequency domain bins and remove low frequency noise and output a plurality of filtered frequency domain bins.

Example 12 provides a method, system, and/or vehicle according to one or more of the preceding and/or following examples, wherein the SNR estimator receives the plurality of filtered frequency domain bins and estimates the SNR for the plurality of filtered frequency domain bins.

Example 13 provides a method, system, and/or vehicle according to one or more of the preceding and/or following examples, wherein the beamformer is a minimum variance distortionless response beamformer, and wherein the beamformer receives the filtered frequency domain bins and filters the filtered frequency domain bins to generate the respective plurality of filtered signals.

Example 14 provides a method, system, and/or vehicle according to one or more of the preceding and/or following examples, wherein the angle is an identified angle, and wherein the processing pipeline further comprises an inverse Fast Fourier transform to convert the plurality of filtered frequency domain bins to a plurality of filtered time domain bins, and wherein the voice activity detector is further configured to: receive the plurality of filtered time domain bins, add a first delay to each of the plurality of time domain bins based on a first lookup angle and generate a first sum of first time delayed bins, the first sum having a first power value, add a second delay to each of the plurality of time domain bins based on a second lookup angle and generate a second sum of second time delayed bins, the second sum having a second power value, and determine that the first power value is greater than the second power value, wherein the identified angle is the first lookup angle.

Example 15 provides a method for two-way communication from a vehicle exterior, comprising: receiving a speech signal at a plurality of microphone arrays, wherein each microphone array includes a plurality of microphones positioned on a vehicle exterior each configured to receive the speech signal, wherein each microphone array outputs a respective plurality of microphone signals; processing the respective plurality of microphone signals for each microphone array at a processing pipeline, wherein processing includes: estimating a signal-to-noise ratio (SNR) for the respective plurality of microphone signals, determining the SNR is above a selected threshold, determining a direction of arrival of the respective plurality of microphone signals at a voice activity detector, wherein the direction of arrival is an angle for which a sum of the plurality of microphone signals has a maximum identified power, determining spatial filtering coefficients based on the angle, filtering the respective plurality of microphone signals based on the spatial filtering coefficients to generate a respective plurality of filtered signals, beamforming the respective plurality of filtered signals to generate a respective processed signal; and mixing the respective processed signal from each microphone array with other respective processed signals from the plurality of microphone arrays to generate a single channel output signal.

Example 16 provides a method, system, and/or vehicle according to one or more of the preceding and/or following examples, further comprising transmitting the single channel output signal to a back office for communication with a remote assistant.

Example 17 provides a method, system, and/or vehicle according to one or more of the preceding and/or following examples, wherein the plurality of microphone arrays include a first microphone array and a second microphone array, wherein the respective plurality of microphone signals include a first plurality of microphone signals and a second plurality of microphone signals, and wherein determining the direction of arrival of the first plurality of microphone signals includes determining a first direction of arrival and determining the direction of arrival of the second plurality of microphone signals includes determining a second direction of arrival, and wherein the first direction of arrival is different from the second direction of arrival.

Example 18 provides a method, system, and/or vehicle according to one or more of the preceding and/or following examples, further comprising: converting the respective plurality of microphone signals to a plurality of frequency domain bins at a fast Fourier transform, filtering the plurality of frequency domain bins at a high pass filter to remove low frequency noise, and outputting a plurality of filtered frequency domain bins from the high pass filter.

Example 19 provides a method, system, and/or vehicle according to one or more of the preceding and/or following examples, wherein estimating the SNR includes estimating the SNR based on the plurality of filtered frequency domain bins, and wherein filtering the respective plurality of microphone signals based on the spatial filtering coefficients includes filtering the filtered frequency domain bins based on the spatial filtering coefficients to generate the respective plurality of filtered signals.

Example 20 provides a method, system, and/or vehicle according to one or more of the preceding and/or following examples, wherein the angle is an identified angle, and further comprising: converting the plurality of filtered frequency domain bins to a plurality of filtered time domain bins at an inverse fast Fourier transform, receiving the plurality of filtered time domain bins at the voice activity detector, adding a first delay to each of the plurality of time domain bins based on a first lookup angle to generate a first sum of first time delayed bins, the first sum having a first power value, adding a second delay to each of the plurality of time domain bins based on a second lookup angle to generate a second sum of second time delayed bins, the second sum having a second power value, and determining that the first power value is greater than the second power value, wherein the identified angle is the first lookup angle.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system, comprising:

a plurality of microphone arrays to receive a speech signal, wherein each microphone array includes a plurality of microphones positioned on a vehicle exterior each configured to receive the speech signal, wherein each microphone array outputs a respective plurality of microphone signals;

a processing pipeline to process the respective plurality of microphone signals for each microphone array including:

a signal-to-noise ratio (SNR) estimator to estimate a SNR for the respective plurality of microphone signals, to determine the SNR is above a selected threshold, a transmit the respective plurality of microphone signals to a voice activity detector, the voice activity detector to determine a direction of arrival of the respective plurality of microphone signals, wherein the direction of arrival is an angle for which a sum of the plurality of microphone signals has a maximum identified power, a beamformer to:

determine spatial filtering coefficients based on the angle, filter the respective plurality of microphone signals based on the spatial filtering coefficients to generate a respective plurality of filtered signals, and beamform the respective plurality of filtered signals to generate a respective processed signal; and a mixer to mix the respective processed signal from each microphone array with other respective processed signals from the plurality of microphone arrays and generate an output signal.

2. The system of claim 1, wherein the vehicle further comprises a transmitter to transmit the output signal to a central computer for communication with the back office.

3. The system of claim 1, wherein the plurality of microphone arrays include a first microphone array and a second microphone array, wherein the respective plurality of microphone signals include a first plurality of microphone signals and a second plurality of microphone signals, wherein the direction of arrival of the first plurality of microphone signals is a first direction of arrival and the direction of arrival of the second plurality of microphone signals is a second direction of arrival, and wherein the first direction of arrival is different from the second direction of arrival.

4. The system of claim 1, wherein the processing pipeline further comprises a Fast Fourier transform to convert the respective plurality of microphone signals to a plurality of frequency domain bins, and a high pass filter to filter the plurality of frequency domain bins and remove low frequency noise and output a plurality of filtered frequency domain bins.

5. The system of claim 4, wherein the SNR estimator receives the plurality of filtered frequency domain bins and estimates the SNR for the plurality of filtered frequency domain bins.

6. The system of claim 5, wherein the beamformer is a minimum variance distortionless response beamformer, and wherein the beamformer receives the filtered frequency domain bins and filters the filtered frequency domain bins to generate the respective plurality of filtered signals.

7. The system of claim 4, wherein the angle is an identified angle, and wherein the processing pipeline further comprises an inverse Fast Fourier transform to convert the plurality of filtered frequency domain bins to a plurality of filtered time domain bins, and wherein the voice activity detector is further configured to:

receive the plurality of filtered time domain bins, add a first delay to each of the plurality of time domain bins based on a first lookup angle and generate a first sum of first time delayed bins, the first sum having a first power value, add a second delay to each of the plurality of time domain bins based on a second lookup angle and generate a second sum of second time delayed bins, the second sum having a second power value, and determine that the first power value is greater than the second power value, wherein the identified angle is the first lookup angle.

8. A vehicle, comprising:

a plurality of microphone arrays to receive a speech signal, wherein each microphone array includes a plurality of microphones positioned on a vehicle exterior each configured to receive the speech signal, wherein each microphone array outputs a respective plurality of microphone signals;

a processing pipeline to process the respective plurality of microphone signals for each microphone array including:

a signal-to-noise ratio (SNR) estimator to estimate a SNR for the respective plurality of microphone signals, and to determine the SNR is above a selected threshold, a voice activity detector to determine a direction of arrival of the respective plurality of microphone signals, wherein the direction of arrival is an angle for which a sum of the plurality of microphone signals has a maximum identified power, a beamformer to:

determine spatial filtering coefficients based on the angle, filter the respective plurality of microphone signals based on the spatial filtering coefficients to generate a respective plurality of filtered signals, and beamform the respective plurality of filtered signals to generate a respective processed signal; and a mixer to mix the respective processed signal from each microphone array with other respective processed signals from the plurality of microphone arrays and generate an output signal.

9. The vehicle of claim 8, further comprising a transmitter to transmit the output signal to a back office for communication with a remote assistant.

10. The vehicle of claim 8, wherein the plurality of microphone arrays include a first microphone array and a second microphone array, wherein the respective plurality of microphone signals include a first plurality of microphone signals and a second plurality of microphone signals, wherein the direction of arrival of the first plurality of microphone signals is a first direction of arrival and the direction of arrival of the second plurality of microphone signals is a second direction of arrival, and wherein the first direction of arrival is different from the second direction of arrival.

11. The vehicle of claim 8, wherein the processing pipeline further comprises a Fast Fourier transform to convert the respective plurality of microphone signals to a plurality of frequency domain bins, and a high pass filter to filter the plurality of frequency domain bins and remove low frequency noise and output a plurality of filtered frequency domain bins.

12. The vehicle of claim 11, wherein the SNR estimator receives the plurality of filtered frequency domain bins and estimates the SNR for the plurality of filtered frequency domain bins.

13. The vehicle of claim 12, wherein the beamformer is a minimum variance distortionless response beamformer, and wherein the beamformer receives the filtered frequency domain bins and filters the filtered frequency domain bins to generate the respective plurality of filtered signals.

14. The vehicle of claim 11, wherein the angle is an identified angle, and wherein the processing pipeline further comprises an inverse Fast Fourier transform to convert the plurality of filtered frequency domain bins to a plurality of filtered time domain bins, and wherein the voice activity detector is further configured to:

receive the plurality of filtered time domain bins, add a first delay to each of the plurality of time domain bins based on a first lookup angle and generate a first sum of first time delayed bins, the first sum having a first power value, add a second delay to each of the plurality of time domain bins based on a second lookup angle and generate a second sum of second time delayed bins, the second sum having a second power value, and determine that the first power value is greater than the second power value, wherein the identified angle is the first lookup angle.

15. A method for communication with a vehicle exterior, comprising:

receiving a speech signal at a plurality of microphone arrays positioned on a vehicle exterior, wherein each microphone array includes a plurality of microphones each configured to receive the speech signal, wherein each microphone array outputs a respective plurality of microphone signals;

processing the respective plurality of microphone signals for each microphone array, wherein processing includes:

estimating a signal-to-noise ratio (SNR) for the respective plurality of microphone signals, determining the SNR is above a selected threshold, in response to determining the SNR is above a selected threshold, determining a direction of arrival of the respective plurality of microphone signals at a voice activity detector, wherein the direction of arrival is an angle for which a sum of the plurality of microphone signals has a maximum identified power, determining spatial filtering coefficients based on the angle, filtering the respective plurality of microphone signals based on the spatial filtering coefficients to generate a respective plurality of filtered signals, beamforming the respective plurality of filtered signals to generate a respective processed signal; and mixing the respective processed signal from each microphone array with other respective processed signals from the plurality of microphone arrays to generate a single channel output signal.

16. The method of claim 15, further comprising transmitting the single channel output signal to a back office for communication with a remote assistant.

17. The method of claim 15, wherein the plurality of microphone arrays includes a first microphone array and a second microphone array, wherein the respective plurality of microphone signals includes a first plurality of microphone signals and a second plurality of microphone signals, and wherein determining the direction of arrival of the first plurality of microphone signals includes determining a first direction of arrival and determining the direction of arrival of the second plurality of microphone signals includes determining a second direction of arrival, and wherein the first direction of arrival is different from the second direction of arrival.

18. The method of claim 15, further comprising:

converting the respective plurality of microphone signals to a plurality of frequency domain bins at a fast Fourier transform, filtering the plurality of frequency domain bins at a high pass filter to remove low frequency noise, and outputting a plurality of filtered frequency domain bins from the high pass filter.

19. The method of claim 18, wherein estimating the SNR includes estimating the SNR based on the plurality of filtered frequency domain bins, and wherein filtering the respective plurality of microphone signals based on the spatial filtering coefficients includes filtering the filtered frequency domain bins based on the spatial filtering coefficients to generate the respective plurality of filtered signals.

20. The method of claim 18, wherein the angle is an identified angle, and further comprising:

converting the plurality of filtered frequency domain bins to a plurality of filtered time domain bins at an inverse fast Fourier transform, receiving the plurality of filtered time domain bins at the voice activity detector, adding a first delay to each of the plurality of time domain bins based on a first lookup angle to generate a first sum of first time delayed bins, the first sum having a first power value, adding a second delay to each of the plurality of time domain bins based on a second lookup angle to generate a second sum of second time delayed bins, the second sum having a second power value, and determining that the first power value is greater than the second power value, wherein the identified angle is the first lookup angle.

* * * * *